H. P. BYRAM.
Cleaning Grass Seed.
No. 10,102.
2 Sheets—Sheet 1.
Patented Oct. 11, 1853.
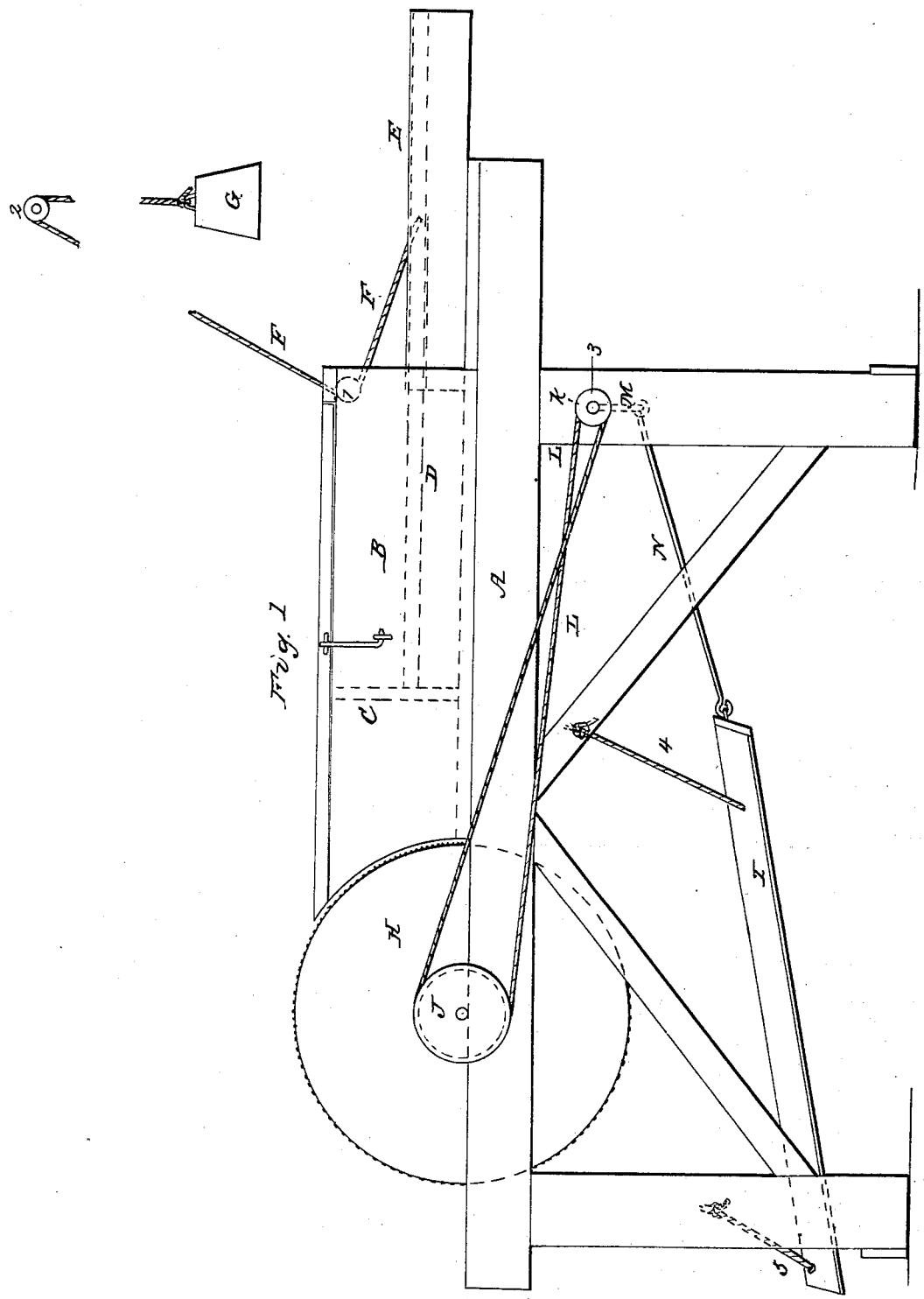

H. P. BYRAM.
Cleaning Grass Seed.
No. 10,102.
2 Sheets—Sheet 2.
Patented Oct. 11, 1853.
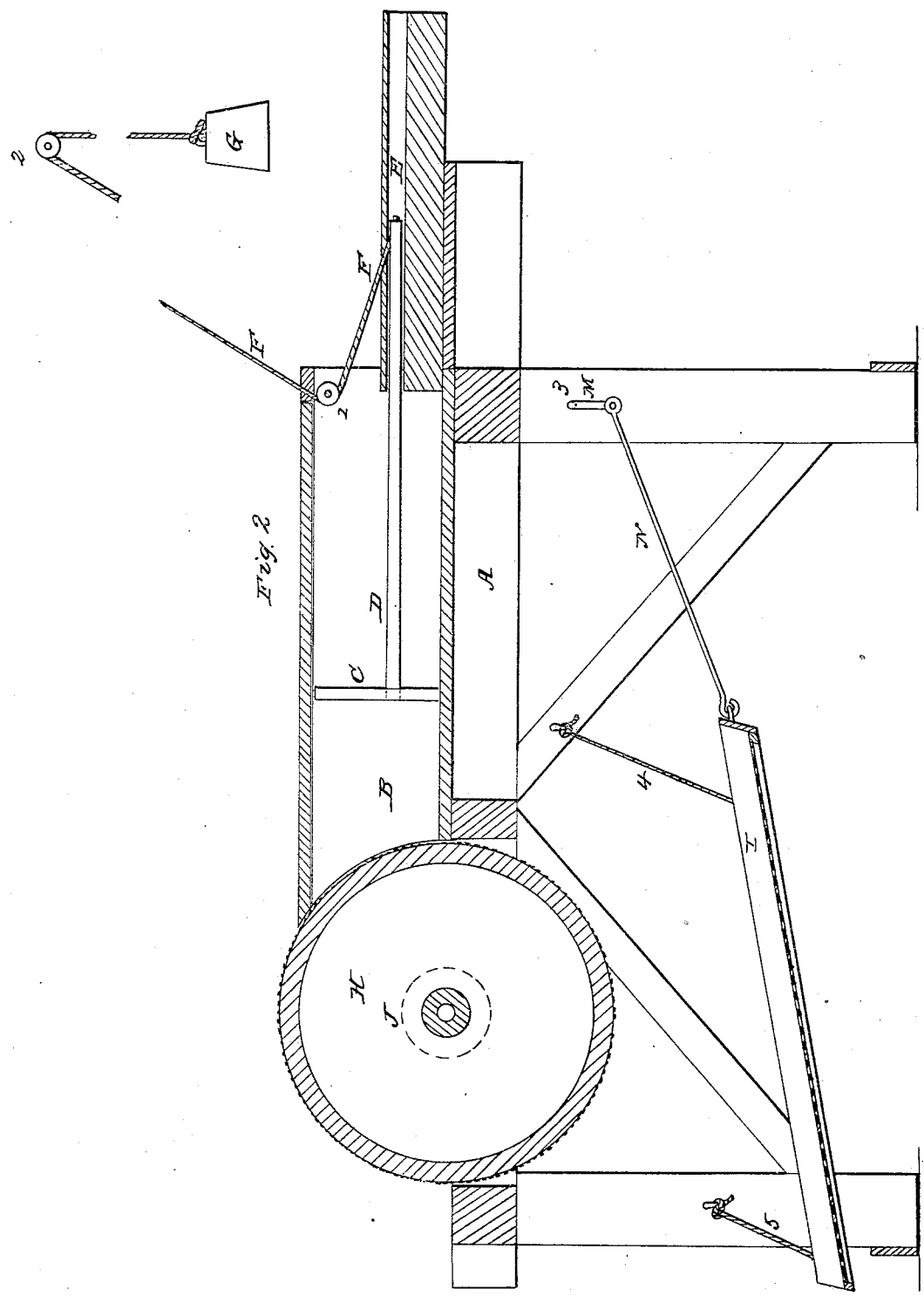

UNITED STATES PATENT OFFICE.

HENRY P. BYRAM, OF LOUISVILLE, KENTUCKY.

HULLER OF GRASS-SEED.

Specification of Letters Patent No. 10,102, dated October 11, 1853.

*To all whom it may concern:*

Be it known that I, HENRY P. BYRAM, of Louisville, in the county of Jefferson and State of Kentucky, have invented certain new and useful Improvements in Machines for Cleaning Blue-Grass and other Similar Seeds; and I do hereby declare the following to be a full, clear, and exact description of the same, reference being had to the accompanying drawings, making a part thereof, in which—

Figure 1, represents a side view, and Fig. 2, a longitudinal, vertical section through the machine.

Similar letters in both figures refer to like parts.

Blue-grass seed has, heretofore, from the extreme delicacy of the seed, and the toughness and tenacity with which the chaff or hull adheres to it, defied the use of power machines to separate them, without damage to the seed; and rubbing by hand has been the only successful, method heretofore practiced, which is both expensive, and disagreeable from the quantity of dust which it throws off.

The nature of my invention consists in removing the chaff or hulls from the seed by pressing and holding it up against an emery or sand wheel, by an unvarying pressure, whether the hopper be more or less full.

To enable others skilled in the art to make and use my invention, I will proceed to describe the same with reference to the drawings.

On a suitable frame or table A, is arranged a box or horizontal hopper B, into which the material to be cleaned is placed. A follower C, is made to fit closely in said box or hopper, on which is an arm D, running back into guides E, in rear of the hopper. A cord F, one end of which is attached to the rear end of the arm D, passes over the pulleys 1, 2, and has a weight G, attached to it, of suitable size to draw forward, as it falls, the follower C. This forces up the seed in the hopper to the emery, sand or glass wheel H, and holds it there with sufficient power for the scouring wheel to cut away the chaff, &c., the seed dropping down onto the screen I, placed underneath it.

Motion may be communicated to the emery-wheel, in any well known manner, and around a pulley J, on its shaft, and over a small pulley K, on the shaft 3, passes an endless belt L. This is for giving motion to the shaft 3, upon which a crank M, is fixed, to which is connected one end of the pitman N, the other end being attached to the screen I, by which arrangement the screen is vibrated. The screen is hung upon the cords 4, 5, and receives an easy motion, just sufficient to separate the seeds from the chaff.

A spring could not be used in place of the weight, for then, the pressure which must be nicely adjusted, would vary with the uncoiling or reaction of the spring. A similar objection would arise, with a vertical hopper—the weight will be constantly varying as the hopper becomes, more or less full.

When the hopper is to be supplied, the door is raised, the follower run back, and the material placed in the hopper. The falling weight carries it up and holds it against the scouring wheel, until the chaff and hull and seed are separated when it drops out as heretofore stated.

Having thus fully described the nature of my invention what I claim therein as new and desire to secure by Letters Patent, is—

In combination with the rubbing or scouring wheel, the method of feeding up, and holding, against the said wheel, the seed to be cleaned, by a pressure which is unvarying, whether the hopper be full or not, substantially as herein described.

H. P. BYRAM.

Witnesses:
A. B. STOUGHTON,
JOHN L. SMITH.